United States Patent [19]
Yamada et al.

[11] 4,396,831
[45] Aug. 2, 1983

[54] SHUTTER CONTROL SYSTEM

[75] Inventors: Akira Yamada; Junzo Makino, both of Tokyo, Japan

[73] Assignee: RCA Corporation, New York, N.Y.

[21] Appl. No.: 230,361

[22] Filed: Jan. 30, 1981

[30] Foreign Application Priority Data

Sep. 2, 1980 [GB] United Kingdom ............... 8028236

[51] Int. Cl.³ .............................................. G01J 1/20
[52] U.S. Cl. ..................................... 250/201; 250/209
[58] Field of Search ............ 290/203, 215, 208, 209, 290/237 R, 214, 205, 201; 160/5; 126/424, 425

[56] References Cited

U.S. PATENT DOCUMENTS

| | | | |
|---|---|---|---|
| 3,064,131 | 11/1962 | Brown | 250/203 R |
| 3,177,367 | 4/1965 | Brown | 250/237 R |
| 3,294,152 | 12/1966 | Kuijvenhoven | 160/5 |
| 3,675,023 | 7/1972 | Kunke et al. | 250/209 |
| 3,885,152 | 5/1975 | Anetseder et al. | 250/215 |
| 3,917,942 | 11/1975 | McCay | 250/203 R |

*Primary Examiner*—David C. Nelms
*Attorney, Agent, or Firm*—Joseph S. Tripoli; Robert L. Troike; William Squire

[57] ABSTRACT

A skylight shutter is driven by a battery-powered d.c. motor through transistor switches operated by Schmitt triggers. A voltage dividing network derives the trigger signals by comparing the resistance of a photoresistor and a variable resistance, whose value determines the direction and degree the shutters are moved. A night sensor operates the Schmitt triggers independently of the remaining circuit for placing the shutters in a closed position to minimize radiation losses during evening hours.

8 Claims, 2 Drawing Figures

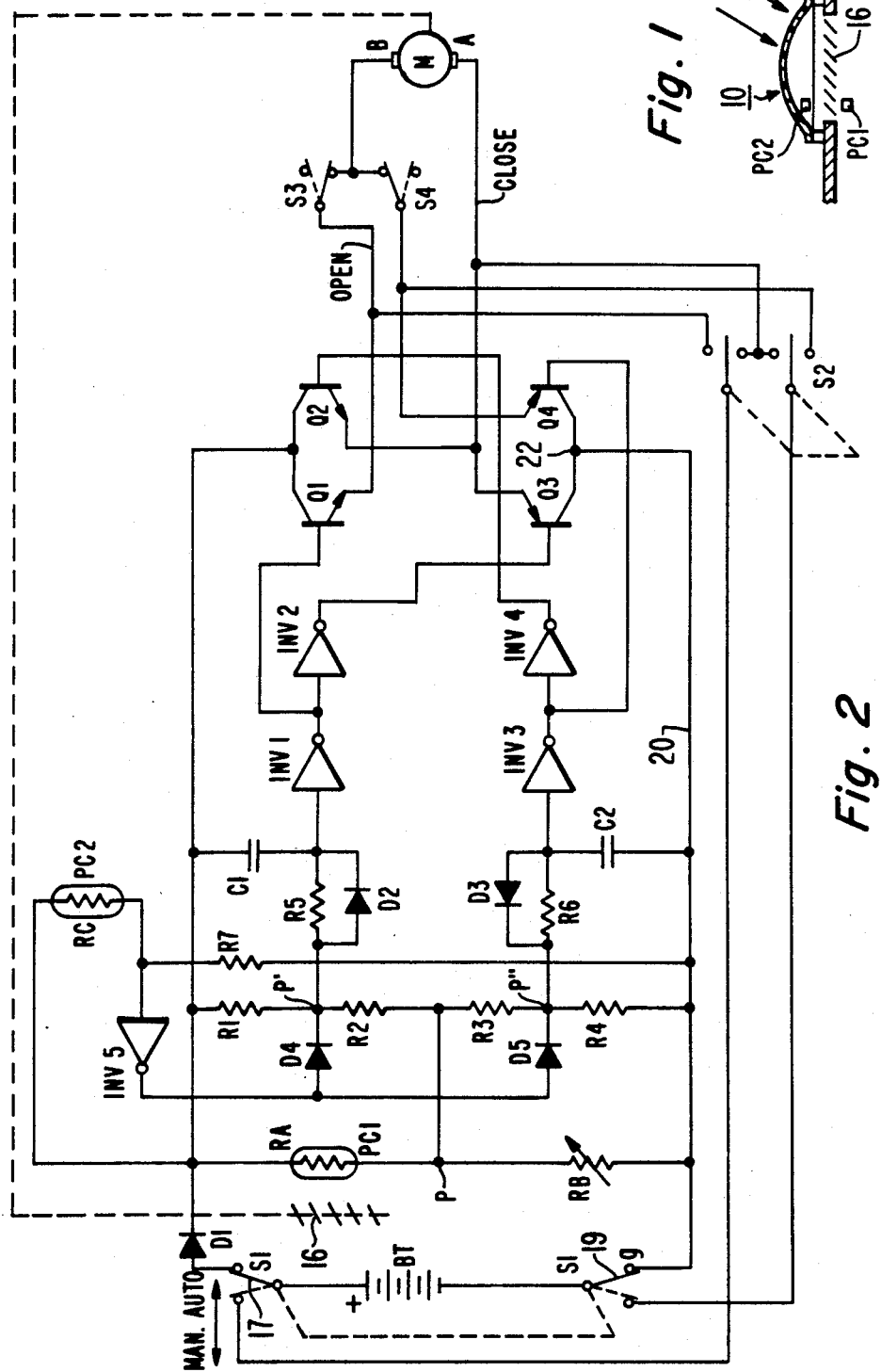

SHUTTER CONTROL SYSTEM

The present invention relates to a shutter system for controlling the light passing through a window or skylight.

According to one aspect of the present invention, a first control means responsive to the intensity of light passed by a shutter generates a signal for opening and closing the shutter in response to decreases and ineases in intensiy of light, respectively, passed by the shutter. A second control means responsive to the intensity of the light to be controlled generates a second signal which overrides the first signal when the light to be controlled has a level below a given threshold. In response thereto, the second control means closes the shutter. This is useful, for example, for automatically closing the shutter at night to reduce loss of heat by radiation.

In accordance with a second aspect of the invention, an electronic shutter control system comprises a light controlling shutter and a d.c. motor drive means for opening and closing the shutter. Switch means comprising solely semiconductor devices for selectively producing shutter open and close signals for operating the drive means in response to a control signal manifesting the intensity of light passed by the shutter.

In the drawing:

FIG. 1 is a sectional view through a skylight employing a shutter system in accordance with an embodiment of the present invention, and FIG. 2 is a schematic circuit diagram of one system embodying the present invention.

In FIG. 1 a transparent skylight 10 is mounted on a roof of a building 12 for passing sun rays into the building interior 14. A shutter 16 is controlled automatically by an electronic control system embodied in the circuit of FIG. 2. A photoresistor PC2 is positioned beneath the skylight to receive the sun rays directly without passing through the shutter 16. A second photoresistor PC1 is placed beneath the shutter 16 to sense the light passed through and controlled by the shutter 16. The circuit of FIG. 2 operates on motor M which selectively opens and closes the shutters 16 in accordance with the intensity of light impinging on the photoresistors PC1 and PC2. The motor tends to close the shutter 16 when the intensity of light incident on PC1 exceeds a given predetermined threshold level. Conversely, the motor opens the shutter when the intensity of the incident light on PC1 decreases below a predetermined threshold level. Photoresistor PC2 senses when the incident light decreases below that level indicating the oncoming evening hours, i.e., night. For example, the level of intensity of light sensed by the photoresistor PC2 may be ten lux or less. When this occurs, the circuit of FIG. 2 automatically overrides the output of PC1 and generates a signal to close the shutter 16. In the latter case the shutter 16 is closed to forestall loss of heat through the building interior 14 by radiation through the skylight 10. This operation is performed to conserve energy within the building interior 14.

The positive terminal of battery BT, which may be a set of penlight-type AA batteries, is coupled to the terminal B of d.c. motor M through manual-automatic switch S1 wiper 17, diode D1 and the collector-emitter path of NPN transistor Q1, which may be a type 2SC734 manufactured by Toshiba, and limit switch S3. Diode D1 is poled to permit current flow from the battery to the terminal B and prevents a reversely inserted battery, that is, one whose polarity is reversed from that illustrated, from damaging the integraged circuit components to be described. Terminal A of the motor is coupled to the same positive terminal through the collector-emitter path of NPN transistor Q2 to the diode D1 cathode. Q2 may be the same type of transistor as Q1. Limit switch S3 is actuated by shutter 16, that is, when the shutter 16 of FIG. 1 is fully opened switch S3 opens disconnecting terminal B from the battery BT. This stops motor M. Limit switch S4 also is actuated by shutter 16, that is, when shutter 16 is fully closed switch S4 opens disconnecting terminal A from the battery which stops motor M.

The negative terminal of battery BT is connected through wiper 19 of switch S1 via lead 20 to connection point 22 between the collectors of PNP transistors Q3 and Q4. Transistors Q3 and Q4 may be type 2SA561 manufactured by Toshiba. The emitter of transistor Q3 is connected to terminal A and the emitter of transistor Q4 is connected through switch S4 to terminal B.

When Q1 and Q3 are conductive, Q2 and Q4 are non-conductive. Assuming switch S3 to be closed and wiper 19 closed to contact g, this connects the positive terminal of battery BT to terminal B of the motor and the negative terminal of battery BT to terminal A of the motor. When Q2 and Q4 are conductive, Q1 and Q3 are non-conductive. If at that time switch S4 is closed and wiper 19 is connected to contact g, terminal A of the motor is coupled to the positive terminal of battery BT and terminal B of the motor is coupled to the negative terminal of BT. Transistors such as transistors Q1-Q4 are employed for directly producing shutter open and close signals for operating the d.c. motor M instead of the usual relay connecting systems of prior art shutter controls. Appendix I shows in more detail how a low powered motor can be driven by a set of penlight (type AA) 1.5 volt batteries for over a period of one year employing the circuit to be described.

The cathode of diode D1 is connected through photoresistor PC1, connection point P, variable resistance RB, and wiper 19 to the negative terminal of BT. Point P is connected to the cathode of diode D1 through serially connected voltage dividing resistances R2 and R1 and to lead 20 through serially connected voltage dividing resistances R3 and R4. Resistances R1 and R4 each have a relatively high current limiting magnitude, 10 megohms in one embodiment, and resistances R2 and R3 each have a relatively low magnitude, preferably in the range of 500K to 1 megohm in the one embodiment. The resistances R2 and R3 have the same value and resistances R1 and R4 have the same value.

Photoresistor PC2 has one terminal connected to the cathode of diode D1 and its second terminal coupled to lead 20 through resistance R7. This second terminal is coupled through inverter INV5 to the anodes of diodes D4 and D5 whose cathodes are respectively connected to the connection points P' and P" between resistances R1, R2 and R3, R4, respectively. Photoresistors PC1 and PC2 are devices whose resistances vary inversely with the light intensity incident on the device. These are cadmium sulfide devices (CdS) and in one embodiment may have a resistance of approximately 10 megohms when the illumination intensity is about ten lux and a resistance of about 10K ohms when the illumination intensity is about 7K lux. Resistance RB has a value which can be adjusted anywhere within the range of value of resistance RA of photoresistor PC1 as will be explained.

The resistances RA, RB, R1, R2, R3, and R4 form a voltage divider network. Voltage $V_1$ appearing at the cathode of diode D4 is determined as shown by equation 1.

$$V_1 = E\left[1 - \frac{\frac{RA \cdot R1}{RA + R1 + R2}}{\frac{RA(R1 + R2)}{RA + R1 + R2} + \frac{RB(R3 + R4)}{RB + R3 + R4}}\right] \quad (1)$$

The voltage $V_2$ at the cathode of diode D5 between the resistances R3 and R4 is determined as shown by equation 2.

$$V_2 = \frac{RB \cdot R4}{RB + R3 + R4} \cdot \frac{E}{\frac{RA(R1 + R2)}{RA + R1 + R2} + \frac{RB(R3 + R4)}{RB + R3 + R4}} \quad (2)$$

where:
E is the voltage of BT and
RA is the internal resistance of PC1.

Where the resistance RA equals the resistance RB the voltages $V_1$ and $V_2$ have the relationship shown by equations 3 and 4.

$$V_1 = E\left[1 - \frac{R1}{2(R1 + R2)}\right] \quad (3)$$

$$V_2 = E \cdot \frac{R4}{2(R3 + R4)} \quad (4)$$

The connection point P' between resistances R1 and R2 is coupled to the input of inverter INV1 through parallel resistance R5 and diode D2. Capacitor C1 is coupled between D1 cathode and the connection point between resistance R5, INV1 input and the cathode of diode D2. The resistances R5, RB, R2 and capacitance C1 provide a delay circuit whose time constant is determined by equation 5 below.

$$d_1(\text{delay}) = C1 \times (RB + R2 + R5)(\text{seconds}) \quad (5)$$

INV1 outout is connected to the input of inverter INV2 and to the base electrode of transistor Q1. The output of INV2 is connected to the base electrode of Q3.

The connection point P" between R3 and R4 is connected to the input of inverter INV3 through time delay resistance R6 which is in parallel with diode D3. The connection point between resistance R6, D3 anode and INV3 input is coupled to lead 20 by capacitor C2. Capacitor C2, resistances R6, RA, R3 form a second time delay circuit as shown by equation 6.

$$d_2(\text{delay}) = C2 \times (RA + R3 + R6) \text{ (seconds)} \quad (6)$$

The poentials at the inputs of INV1 and INV3 do not reach their operating level until the end of the time delays when the corresponding capacitances C1 and C2 are fully charged.

The charge and discharge paths for capacitors C1 and C2 are as follows.
C1 charge: BT(+)→D1→C1→R5→R2→RB→BT(−)
C1 discharge: C1→RA→R2→D2→C1
C2 charge: BT(+)→D1→RA→R3→R6→C2→BT(−)
C2 discharge: C2→D3→R3→RB→C2

The output of INV3 is connected to the base electrode of Q4 and to the input of inverter INV4. The output of INV4 is connected to the base electrode of Q2. Inverters INV1, INV2, INV3, and INV4 are Schmitt trigger circuits and may be included on a single integrated circuit chip of the type employed in a CD40106B integrated circuit array maufactured by RCA Corporation's Solid State Division, Somerville, New Jersey. These inverters each comprise like Schmitt triggers which advantageously are employed for their low power requirements. That is, by operating the transistors Q1–Q4 with trigger signals from the Schmitt circuits Q1–Q4 do not require a separate biasing arrangement. This aids the low power consumption of the circuit.

R2 and R3 maintain a potential difference between the input trigger voltages V1 and V2 of INV1 and INV3, respectively, and create voltages V1 and V2 at the inputs of INV1 and INV3 which are proportional to the change in value of resistance of RA as set forth in equations 1, 2, 3, and 4. That is, the voltages applied to the inputs of INV1 and INV3 will increase or decrease in inverse proportion to the increase or decrease of the value of the resistance RA as given by the equations 1, 2, 3, and 4 above. If the values of resistances R2 and R3 are set high, then variation of the resistance RA will result in smaller voltages at the inputs of INV1 and INV3.

Each of the Schmitt triggers INV1–INV4 is triggered when the input potential reaches a given threshold level. Until the input reaches that threshold level, the output will be at a given constant level provided, of course, the input is at an operating level.

The resistance RB is variable to set the desired intensity of illumination to be passed through the shutter 16. For a given illumination, PC1 will have a given resistance RA between the limits described above. Motor M has its operating shaft connected to the shutter 16 as represented by the dashed line so that when the shutter moves in response to motor M, the light intensity on PC1 varies accordingly and this, in turn, alters the value of the resistance RA. When the value of the resistance RA approaches the value of the resistance RB, the voltage dividing network comprising resistances R1–R4 are such that the input to INV1 will be above its threshold level and the input of INV3 will be below its threshold level. These values of input potentials tend to stop the motor by cutting off transistors Q1–Q4. Reference is made to Table I to show these relationships.

TABLE I

| (1) When RA = RB | | | | | | | |
|---|---|---|---|---|---|---|---|
| Voltage at connection between R1 and R2 | C1 | INV1 input | INV1 output | INV2 output | Q1 | Q3 | Motor |
| ATL (high) | Discharge | ATL | Low | High | Cut-Off Q2 | Cut-Off Q4 | Stop |
| Voltage at connection between R3 and R4 | C2 | INV3 input | INV3 output | INV4 output | Q2 | Q4 | |
| BTL (low) | Discharge | BTL | High | Low | Cut-off | Cut-off | Stop |
| (2) When RA > RB | | | | | | | |

TABLE I-continued

| | C1 | INV1 input | INV1 output | INV2 output | Q1 | Q3 | |
|---|---|---|---|---|---|---|---|
| Voltage at connection between R1 and R2 | | | | | | | |
| BTL (low) | Charge | BTL | High | Low | On | On | Open |
| Voltage at connection between R3 and R4 | C2 | INV3 input | INV3 output | INV4 output | Q2 | Q4 | |
| BTL (low) | Discharge | BTL | High | Low | Cut-off | Cut-off | |

(3) When RA < RB

| | C1 | INV1 input | INV1 output | INV2 output | Q1 | Q3 | |
|---|---|---|---|---|---|---|---|
| Voltage at connection between R1 and R2 | | | | | | | |
| ATL (high) | Discharge | ATL | Low | High | Cut-off | Cut-off | |
| Voltage at connection between R3 and R4 | C2 | INV3 input | INV3 output | INV4 output | Q2 | Q4 | |
| ATL (high) | Charge | ATL | Low | High | On | On | Close | where:
ATL ... Above trigger threshold voltage
BTL ... Below trigger threshold voltage Examination of Table I shows the various relationships between the elements of the circuit and their operation under certain conditions of RA and RB. These relationships are self-explanatory.

By way of example, when the resistance RA is greater than RB, a low light level through the shutter 16 is indicated. In this case it is desired to open the shutter. As RA increases in value the capacitor C1 charges to a higher value. The reason for providing this charging over a time delay is that it is undesirable to open and close the shutters in response to momentary shadowing effect due to passing clouds. Therefore the time delay of this circuit as described in equation 5 prevents operation of INV1 until C1 is charged. When C1 is charged to a relatively high level, the voltage at the input of INV1 is at a relatively low level, below the trigger threshold of INV1. INV1 therefore produces an output that is high. This high causes INV2 to produce a low output. These outputs turn on Q1 and Q3 which couple the positive terminal of BT through Q1 to terminal B and the negative terminal of BT through Q3 to terminal A. The current from the battery BT always flows in the same direction regardless which terminal A or B receives the drive current. In this period capacitor C2 discharges, the input of INV3 is below its threshold level, its output is high, the output of INV4 is low and Q2 and Q4 are cut off. No power is supplied through Q2 and Q4 to motor M. Examination of Table I shows the conditions when the resistance RA has a value less than RB. In this case illumination is greater than desired as determined by the value of resistance RB and the motor moves the shutter in a closing direction.

By way of example, assume BT is 6 volts and the other components have values expressed below, it can be shown that when RA=RB, the voltage between P' and lead 20 becomes approximately 3.3 V, calculating from equation (3). In this state, D2 is cut-off and the input voltage of INV1 is above its trigger threshold voltage. C1 will be initially charged by the voltage difference, (6 V−3.3 V=2.7 V) which appears across R1, and the charge continues until the potential difference across C1 is 2.7 V. The charge current will flow mainly through R5, R2 and RB.

When RA<RB, (for example, RA=500kΩ and RB=100kΩ) the voltage at P' will become "low," approximately 1.5 V, calculating from equation (1). In this state, D2 is still cut-off and the voltage difference, (6 V−1.5 V=4.5 V) will appear across R1. Again C1 starts to charge and this continues until the potential difference across C1 is equal to 4.5 V. Therefore the input voltage of INV1 can not become "low" (from 3.3 V to 1.5 V), during the charging of C1.

After RA=RB is attained, by motor M revolution, the voltage at P' becomes 3.3 V and D2 conducts. Then C1 starts to discharge mainly through RA, R2 and D2. The discharge will continue until the potential difference across C1 is equal to 2.7 V. The discharge constant is C1×(RA+R2).

When RA<RB, (for instance, RA=50kΩ and RB=100kΩ) the voltage of P' will become "high" approximately 4.2 V, calculating from the equation (1). In this state, D2 is forward biased and C1 will discharge mainly through RA, R2 and D2 until the potential difference across C1 equals 1.8 V. But INV1 does not switch states because the input voltage for INV1 is still high after finishing the discharge.

The charging of C2 is explained similarly as for C1, calculating from equations (4) and (2). When RA=RB, P'' is 2.7 V, if RA (500kΩ)>RB(100kΩ) P'' becomes 0.9 V, and if RA(50kΩ)<RB(100kΩ) P'' becomes 3.6 V.

INV5 is a Schmitt trigger device which is included in the RCA CD40106B described above. PC2 is exposed to ambient light conditions. During evening hours when it becomes dark the internal resistance of PC2 increases. This increase in resistance in combination with the value of resistance R7 provide a voltage divider which reduces the input voltage to INV5 to a value below its trigger threshold level. At this time the output of INV5 goes high which otherwise is low. This high signal is supplied diodes D4 and D5, respectively, making them conductive, and then through resistances R5 and R6 to the inputs of INV1 and INV3. As seen in Table I, a high input to INV1 cuts off transistors Q1 and Q3 while a high input to INV3 turns on Q2 and Q4. This closes the shutter 16. The closing of shutter 16 as described above prevents radiation of the building internal thermal energy to the ambient through the window or skylight. Diodes D4 and D5 are switching diodes which isolate high signals at the input of INV1 and INV3 from INV5 when the INV5 output is low.

If the input level of the INV1 were low and that of INV3 high, then undesirable simultaneous operation of the motor in two different directions would be attempted by the circuit. This condition is not produced by the circuit as examination of Table I will show since the input to INV1 always goes high at the RA=RB crossover point.

Not shown are current limiting resistors which may be added in series with RA and RB for a practical embodiment. Because relays and delay relays are not employed, and because Schmitt trigger circuits are employed to operate the transistors which therefore do not require a biasing circuit, relatively low power consumption is required. The appendix describes the relationships for employing a low power motor M which draws an operating current of 22mA and can be driven by four conventional penlight cells (Type AA) over a period of about a year assuming opening and closing of the shutters 65 times a day.

Switches S1 and S2 connect BT to the motor M for manually operating the shutters independent of the circuit described above. By connecting the switch S1, as shown dashed, power is applied to switch S2, that is, the negative terminal of BT connects to the lower wiper and the positive terminal to the upper wiper. Switch S2 connects power to the appropriate terminals of motor M to either open or close the shutters. Not shown is a 10 microfarad filtering capacitor which can be connected between the cathode of diode D1 and terminal g of switch S1. The following is a list of components which may be employed in one embodiment. p0 Diode D1 Toshiba silicon 1S1555.
Motor M, M16N-4 spec. R-14-0792 maufactured by Mitsumi.
Photosensor PC1, PC2 (CdS, MPY-7H69 0.5M at 100 Lux) manufactured by Moririka.
R2 and R3 560KΩ or 1MΩ±5% ⅛ watt
R1 and R4 10MΩ±5% at ⅛ watt
RB slide potentiometer LEE 4A-003 1MΩ manufactured by Alps.
Speed change gear connected between the output shaft of motor M and shutter 16 having a gear ratio of approximately 300:1 manufactured by Imai Kagaku.
R7 4.7MΩ 5% ⅛ watt.

APPENDIX

The general relationship between the discharge resistance (R) and the continuous discharge duration (T) of a battery type AA, 1.5 volt is given by:

$$\log T = A - n \log R \quad (1A)$$

where, A and n are constants. According to Zimmerman (J. G. Zimmermann: Trans. on Electrochem. Soc., 53, 103(1928)), the value of n depends upon the battery discharge rate. However, n=1.5 is applicable in general. Equation 1A is transformed to:

$$T = C R^n \quad (2A)$$

where, C is a constant.

In the case of n=1.5 and R=1.5 V/80 μA=20000Ω, the continuous discharge duration T is calculated by the following procedure. It can be shown that the continuous discharge duration T is 30 hours for a discharge resistance of R=50Ω, assuming that the end point voltage of the battery is 0.9 V. Therefore, the value of C is obtained as follows:

$$C = \frac{T}{R^n} = \frac{30}{50^{(1.5)}} = 0.08 \quad (3A)$$

When the circuit current of 80 μA is continuously consumed, T is given by:

$$T = 0.08 \times (20000)^{1.5} = 226274 \text{ (h)} \quad (4A)$$

The consumed power capacity of the battery after one year is $$\frac{24(h) \times 365(day)}{226274(h)} \times 100 = 3.9(\%) \quad (5A)$$

Next, the number of cycles that the shutter blades can be opened or closed by the remaining power capacity (96.1%) of the battery is determined assuming a d.c. motor current of 22mA, and a discharge resistance R=1.5 V/22mA=68Ω. Then, $$T = 0.08 \times (68)^{1.5} = 44.9(h) \quad (6A)$$

The time required for one opening or closing operation of the motor is 6.5 sec., $$\frac{44.9(h) \times 3600(sec) \times 0.961}{6.5(sec) \times 365(day)} = 65.5 \text{ (Times/day)} \quad (7A)$$

The degradation of the battery due to one-year storage is about 20%. However, the end point voltage of the battery for the electronic control system is 0.8 V. That is, it is estimated that the increase of the continuous discharge duration due to the elongation of the end point voltage from 0.9 V to 0.8 V is about 20%. Therefore, the degradation of the battery due to storage is negligible.

For battery operation, low power consumption of the system described above is an indispensable requirement. In the system including components as listed where the auto/manual switch is on "Auto," the circuit current is 80 μA for a battery voltage of 6 V and 6 μA for a battery voltage of 3.2 V.

The motor driving current is low at approximately 22mA by operating the motor in a nearly no-load running condition employing a low gear ratio of about 300:1 to drive the shutters.

In the system described, the time required for adjusting the blade angle by 90 degrees is about 6.5 sec. It is estimated that four conventional penlight cells (each 1.5 V, SUM-3, Type AA) are usable for a minimum of one year on the assumption that the shutter blades are opened, closed, or adjusted 65 times a day.

What is claimd is:
1. A light controlling shutter system comprising:
drive means for placing said shutter in a given light passing state in response to an applied drive input signal,
first control means responsive to the intensity of light passed by said shutter for generating a first drive means input signal having one value for opening the shutter in response to a decrease in intensity of light passed by said shutter and a second value for closing the shutter in response to an increase in intensity of light passed by said shutter, and
second control means responsive to the intensity of said light to be controlled for generating a second drive means input signal having a third value when said light to be controlled has a level below a given threshold to close the shutter, said first and second control means including means for overriding said first input signal with said second input signal when said second input signal has said third value.
2. The system of claim 1 wherein said first control means includes delay means responsive to said passed light intensity for delaying said opening and closing of said shutter by said first input signal.
3. The system of claim 1 wherein said first control means includes light sense means for generating a third signal manifesting said passed light intensity, first and second trigger means responsive to said third signal for producing a set of switch control signals respresenting a given switch state corresponding to the level of said passed light intensity and switch means responsive to said set of switch control signals to provide as an output said first input signal.

4. The system of claim 3 wherein said second control means includes a light sensor for generating a fourth signal manifesting said level of light below said given threshold, means responsive to said fourth signal applied as an input thereto for producing a trigger signal and applying said trigger signal to said trigger means to produce said set of said switch control signals which always close said shutter regardless the value of said first input signal.

5. The system of claim 1 wherein said first control means includes:
- a light sensor whose resistance is an inverse function of light intensity and a variable resistance in series with said sensor,
- means for applying a voltage across said sensor and variable resistance,
- means coupled to said sensor and resistance for producing first and second trigger signals manifesting the difference in resistance between said sensor and variable resistance,
- switch means responsive to said trigger signals for providing a first current path for said applied voltage when the light is above a given threshold, a second current path when the light is below said given threshold, and an open current path when said resistances are about the same value, and
- means for coupling said drive means to said switch means.

6. A light controlling shutter system comprising:
first and second terminals for receiving an applied voltage,
light sensor means and a variable resistance serially connected between said terminals, said sensor means having a resistance which varies as a function of light intensity,
means coupled to said sensor means and said resistance for producing first and second signals manifesting the respective magnitudes of the resistance of said sensor means and variable resistance,
switch means aternatively having a first state for providing a clockwise motor drive signal, a second state for providing a counterclockwise motor drive signal and a third neutral state in response to a switch control signal applied as an input thereto, and
trigger means responsive to said first and second signals applied as inputs thereto for providing said switch control signal as an output thereof, said switch control signal representing the relative magnitude of said resistances.

7. The system of claim 6 wherein:
said means for producing first and second signals comprises means for producing said first and second signals at different levels when the resistances have about the same value, at a high level when the resistances have a first relative magnitude relationship and at a low level when the resistances have a second relative magnitude relationship opposite to that of the high level relationship, and
said trigger means includes first and second pairs of serially connected Schmitt triggers each operating as an inverter and responsive to said first and second signal levels, said first and second pairs producing said neutral switch control signal when the first and second signals have a given opposite level, the first state when the first and second signals are both high, and the second state when both signals are low.

8. The system of claim 7 further including a d.c. motor coupled to said switch means, said switch means coupling said motor to said terinals only when in either said first or second states.

* * * * *

UNITED STATES PATENT AND TRADEMARK OFFICE
CERTIFICATE OF CORRECTION

PATENT NO. : 4,396,831

DATED : August 2, 1983

INVENTOR(S) : Akira Yamada et al.

It is certified that error appears in the above-identified patent and that said Letters Patent is hereby corrected as shown below:

Column 1, line 10, "inreases" should be --increases--.

Column 3, line 48, "outout" should be --output--.

Column 3, line 61, "poentials" should be --potentials--.

Column 4, line 55, "in-" should be --input--.

Column 6, line 7, "RA<RB" should be --RA>RB--.

Column 7, line 18, delete "p0", and "Diode D1" should be a new paragraph.

Column 7, lines 41, 42, "Zimmerman" should be --Zimmermann--.

Column 10, line 7, "aternatively" should be --alternatively--.

Signed and Sealed this

Twenty-fourth Day of January 1984

[SEAL]

Attest:

GERALD J. MOSSINGHOFF

Attesting Officer　　Commissioner of Patents and Trademarks